Aug. 23, 1938.　　　F. SCHMIDT　　　2,127,942
ELASTIC COUPLING
Filed Sept. 13, 1937
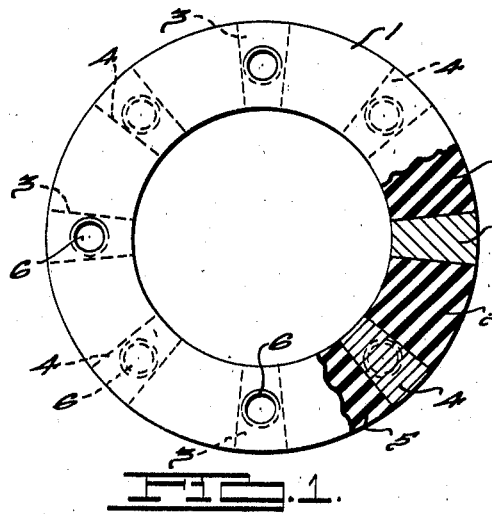
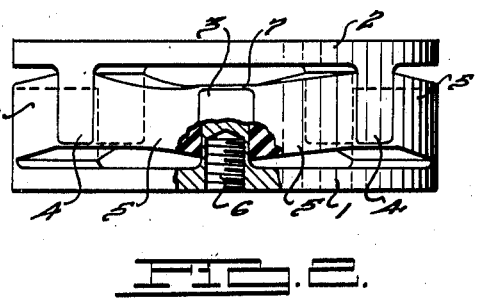
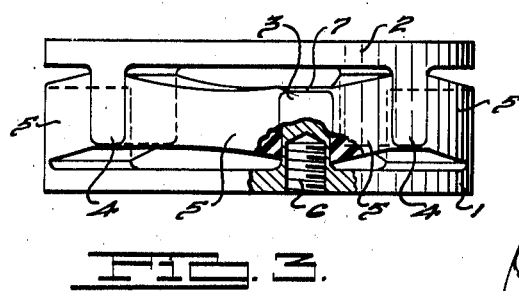
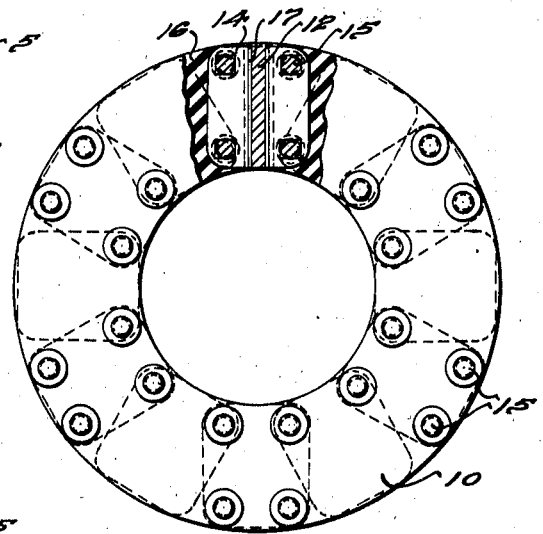
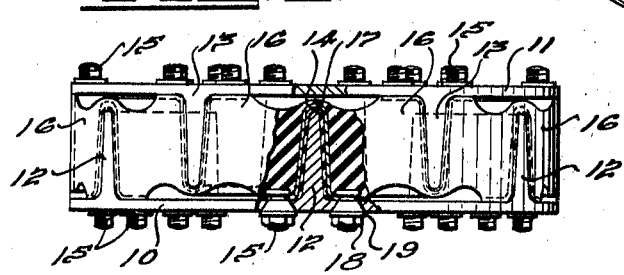
INVENTOR
*Fritz Schmidt*
BY
*Harness, Dickey & Pierce.*
ATTORNEYS.

Patented Aug. 23, 1938

2,127,942

UNITED STATES PATENT OFFICE 2,127,942

ELASTIC COUPLING

Fritz Schmidt, Harburg-Wilhelmsburg, Germany, assignor to Metalastik Ltd., Leicester, England, a British firm Application September 13, 1937, Serial No. 163,640. In Germany March 20, 1936

4 Claims. (Cl. 64—14)

The invention relates to an elastic coupling, in which rubber is employed as a flexible constructional material, and it is so connected with the supporting metal part, by the use of adhesive or by vulcanizing it to the part, that the adhesion between rubber and metal equals or exceeds the tensile strength of the former.

The object of the invention is for example to absorb, during operation of two shafts connected by the coupling, the irregularities of rotary motion, of reciprocal axial positions, and of angular position thereby occurring, and thus to prevent injury to the stressed parts.

Another object of the invention is to elastically absorb and damp disturbing oscillations or vibrations of the rotary motion, of the parallel displacement, and of angular deviation from the axial position, which occur during operation, so that injury to the stressed parts is avoided.

The means hereby employed are simple, and give the subject of the invention a compact construction, which also permits of economical manufacture. It is in the nature of the subject of the invention that its application is not limited to the coupling field, but extends into the various fields of pure springs, so that in many cases an accurate designation can not be given from the result.

The drawing illustrates two forms of construction of the invention, wherein,

Fig. 1 is a plan view with parts broken away;

Fig. 2 is a front view, with a partial cross section through the centerline of a threaded hole;

Fig. 3 is a view similar to Fig. 2, but showing a variation thereof;

Figs. 4 and 5 are similar views of the second form of the invention, Fig. 4 being a plan view with parts broken away, and Fig. 5 is a side view of Fig. 4 with parts broken away.

The coupling shown by Figs. 1 and 2 consists of two metal plates 1 and 2, disposed opposite to each other and connected with the coupling parts. These are provided with radially set ribs 3 and 4 respectively, which are for example, in each case, four in number as shown in the drawing. It may be mentioned, however, that the ribs instead of being radial, may be segments directed spirally of the axis. In the peripheral direction the ribs alternate with one another as regards being associated with the plates 1 and 2, and as a rule have equal spacing. Between them rubber is connected to the ribs by adhesive or by vulcanization, in the form of individual blocks 5, so that it to a certain extent forms bridges that are unenclosed on four sides and that are as a rule, for reasons that will be explained further on, given a somewhat diagonal position relatively to the planes of the plates 1 and 2. Threaded holes 6 formed in the plates, and which extend into the ribs 3 and 4, serve for attaching the plates to the machine parts that are to be connected. For the purpose of quieting noise, the front faces of the ribs 3 and 4 are covered with a rubber layer 7 of suitable thickness.

The coupling has the purpose of absorbing oscillations or vibrations and shocks of many kinds, principally in the form of compression and tension stresses, and sometimes also as shear. When the plate 1 and ribs are used to drive the coupling, the rubber blocks 5 situated in front of the ribs 3 in the direction of rotation, are stressed in compression, while the blocks situated behind are stressed in tension, and in this wise the irregularities relatively to the driven part 2, 4 are compensated for. The flexibility of the rubber blocks 5 in the form according to the invention is very large, mainly because of the capability each separate rubber block 5 has to yield toward its four sides. A further possibility of employing the elastic properties of the coupling exists with shafts which during operation are displaced relatively to each other in an axial direction. Such displacements may also be taken up and damped by the coupling in combination with rotary oscillations or vibrations. In addition, vibrations or shocks resulting from alterations in the angular position of two shafts connected by the coupling may also be damped. By way of example, with the conditions shown in the drawing, an angular displacement of the plates of plus or minus three degrees may occur without overstressing the rubber parts 5.

When vibrations or oscillations in the driving shaft occur, there is a possibility that synchronism with the natural oscillation or vibration of the rubber of the blocks may occur, whereby an oscillation of the same would be brought about. In order to avoid this undesirable phenomenon, various methods can be suggested. For example, the rubber blocks 5 may be given different hardnesses depending upon their position in front of or behind the ribs 3 of the driving part 1, whereby the natural frequency of each group of the blocks 5 is a different one, and prevents synchronous oscillation with the driving part. The same result may be attained if, while using rubber of uniform hardness, the cross section of the rubber blocks 5 is of different size in front of and behind the ribs 3 as shown by Fig. 2, which results in a difference in the oscillation frequency. A third method is to so turn the plates 1 and 2 relatively to each other, prior to introduction of the rubber blocks 5, that the distance apart of the ribs 3 and 4 relatively to one another, together with the size of the subsequently applied rubber blocks, varies. This variation is shown by Fig. 3.

The coupling of the type for which application is made is moreover adapted to the transmission of the rotary forces that are acting, should the rubber be destroyed, by overheating for example, because in this case the ribs 3 and 4 rest against each other, and form a mechanical connection, although a loose one.

If the coupling is for example employed with the half-axles of automobiles, then its action may be principally that of a pure spring, while its importance as a coupling is subordinate. In such cases the spring action may be regulated, in accordance with the objective sought by disposing a number of single rubber-metal parts between the parts that are to be resiliently connected. For example, a spring of the type illustrated in the drawing, under the action of rotary forces, can undergo without injury a twisting of plus or minus eleven degrees, which would be increased to plus or minus twenty-two degrees by setting two springs one behind the other in the manner referred to, and so on.

The construction shown by Figs. 4 and 5 also includes plates indicated at 10 and 11 having ribs 12 and 13. In this case the rubber blocks are not vulcanized directly to the ribs 12 and 13 of the plates, because various drawbacks would appear. On the contrary, bent sheet metal parts 14 are employed as binding elements, which, in a two-part form, are brought into opposite positions suitable for the finished coupling, by means of threaded bolts 15 and are vulcanized to the rubber mass indicated at 16 which is subsequently filled in. A thin layer 17 of rubber is also applied to the inner surface of each sheet metal part 14. The complete vulcanized-together parts 16, 14, 15, 17, give a ring which is flexible in various directions, and which permits of exact adaptation of the rib plates 10, 12 and 11, 13, as connection flanges for the shafts that are to be coupled. The attachment of the sheet metal parts 14 to the ribs 12 and 13 is effected by nuts 18 and conical washers 19, whereby the rubber layer 17 procures exact contact, so that rubbing and rattling between the parts 14 and 12 and 13 respectively is prevented during operation. At the same time, spacing errors, such as may for example occur in the casting of the rib plates 10, 12, and 11, 13 respectively, are easily corrected without detrimental consequences.

During the operation or running of the coupling, rotary oscillations or vibrations, which consist of the speeding up or the lagging of one coupling flange relatively to the other, are damped, in that the rubber blocks which are disposed in front of the moving ribs (relatively to the direction of rotation) are stressed in compression, and the blocks disposed behind are stressed in tension. Oscillations or vibrations of the two shafts, connected with each other by the coupling, from their co-axial position are made evident by parallel displacement of both coupling flanges 10, 11, and 12, 13 in the direction of a certain diameter. This results in combined shear, compression, and tension stresses in the rubber blocks, depending upon the position of the ribs 12 and 13 relatively to the direction of the oscillations or vibrations.

During angular deviation of the shafts connected together by the coupling, a twisting of the one coupling flange relatively to the other one occurs, about a diameter as axis, so that the plate halves on one side of the axis of rotation approach each other, and move away from each other on the other side. Combined stresses of various types hereby occur in the individual rubber blocks.

All these oscillations or vibrations are thoroughly damped by the tendency of the rubber blocks to return to their normal position or shape, whereby a selection of the rubber hardness adapted to the purpose under consideration permits of adaptation within wide limits. The cross-sectional shape of the rubber blocks permits of sufficient yielding capability during compression stresses.

What is claimed is:

1. A coupling comprising axially spaced plates each having ribs projecting from its face next to the other plates with the ribs on one plate alternating circumferentially with the ribs on the other, and rubber blocks between the ribs and adhering thereto, said blocks extending diagonally to the planes of the plates.

2. A coupling comprising axially spaced plates each having ribs projecting from its face next to the other plates with the ribs on one plate alternating circumferentially with the ribs on the other, and rubber blocks between the ribs and adhering thereto, the blocks in rotational advance of the ribs on the driving plate differing in hardness with respect to the hardness of the blocks on the lag side of said ribs.

3. A coupling comprising axially spaced plates each having ribs projecting from its face next to the other plates with the ribs on one plate alternating circumferentially with the ribs on the other, and rubber blocks between the ribs and adhering thereto, the blocks in rotational advance of the ribs on the driving plate having a different vibrational frequency as compared to the vibrational frequency of the blocks at the lag side of said ribs.

4. A coupling comprising axially spaced plates each having ribs projecting from its face next to the other plate with the ribs on one plate alternating circumferentially with the ribs on the other plate, sheet metal elements covering the ribs and detachably connected to the plates, rubber between the sheet metal elements and adhering thereto, and a thin layer of cushioning material between each sheet metal element and the rib it covers.

FRITZ SCHMIDT.